Sept. 22, 1953    R. J. FAHEY ET AL    2,652,960
CARTON HANDLING AND LOADING APPARATUS
Filed Dec. 23, 1948    6 Sheets-Sheet 3

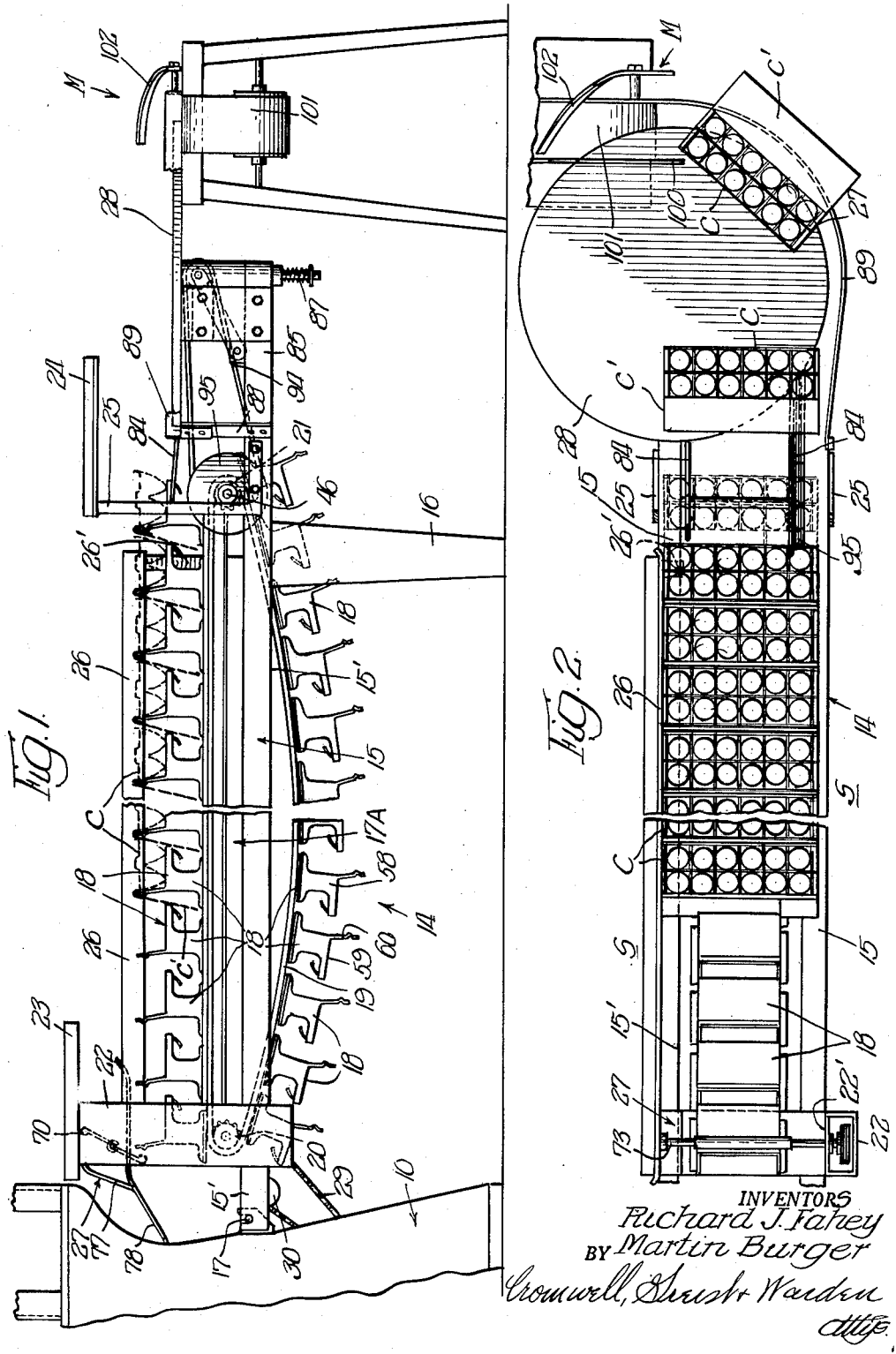

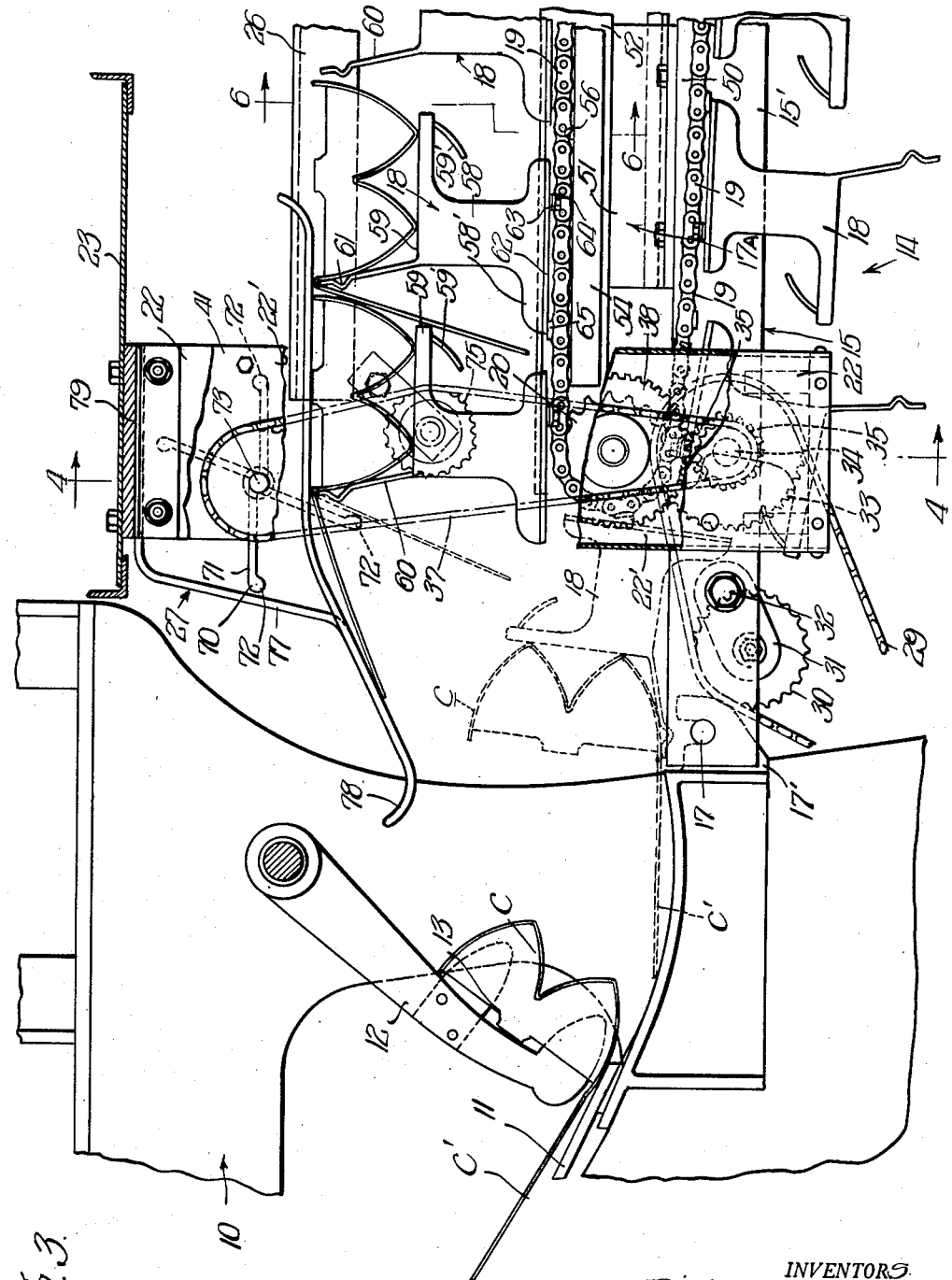

INVENTORS
Richard J Fahey
BY Martin Burger,
Cromwell, Greist & Warden
ATTYS.

Sept. 22, 1953 R. J. FAHEY ET AL 2,652,960
CARTON HANDLING AND LOADING APPARATUS
Filed Dec. 23, 1948 6 Sheets-Sheet 4
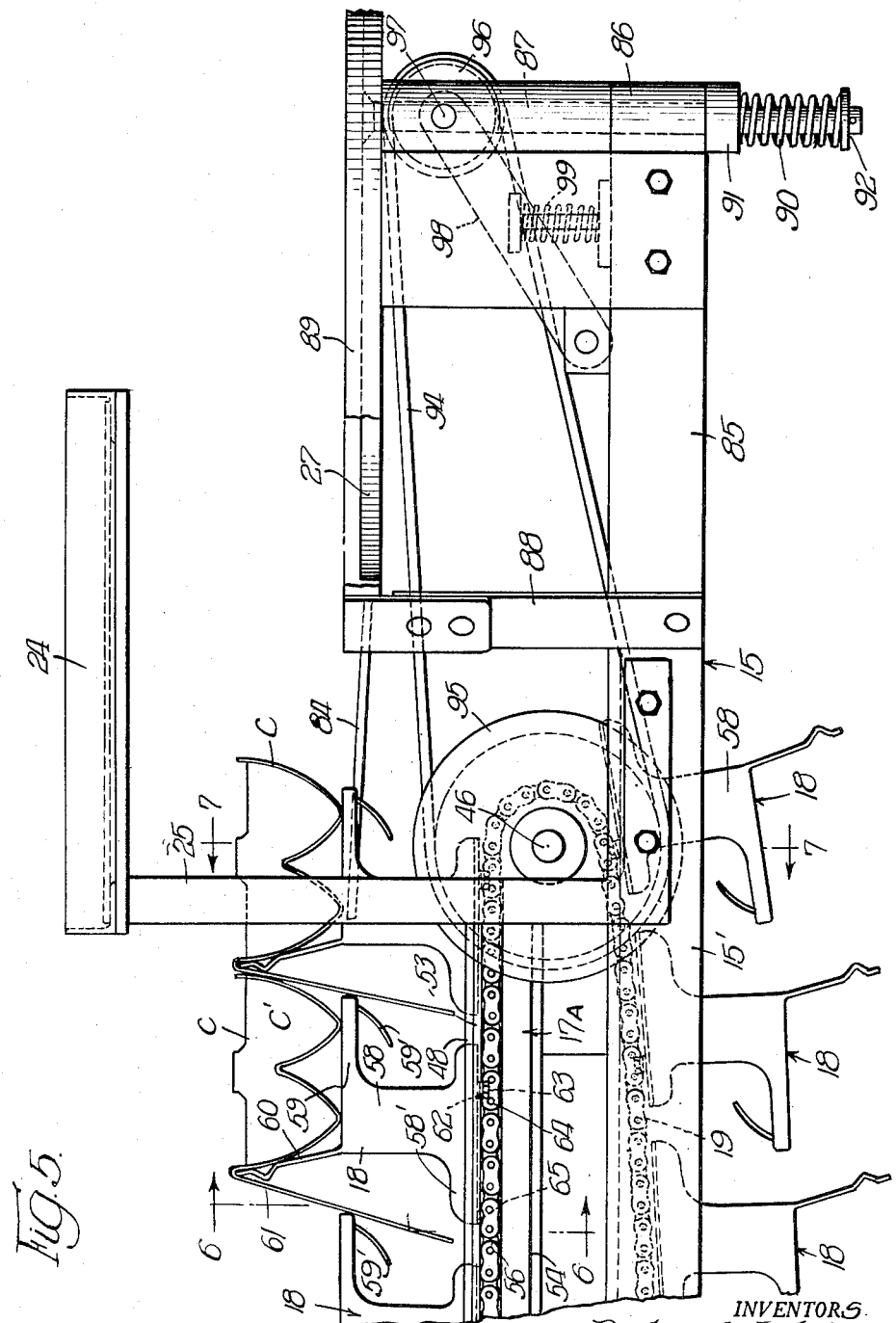

Sept. 22, 1953  R. J. FAHEY ET AL  2,652,960
CARTON HANDLING AND LOADING APPARATUS
Filed Dec. 23, 1948  6 Sheets-Sheet 5
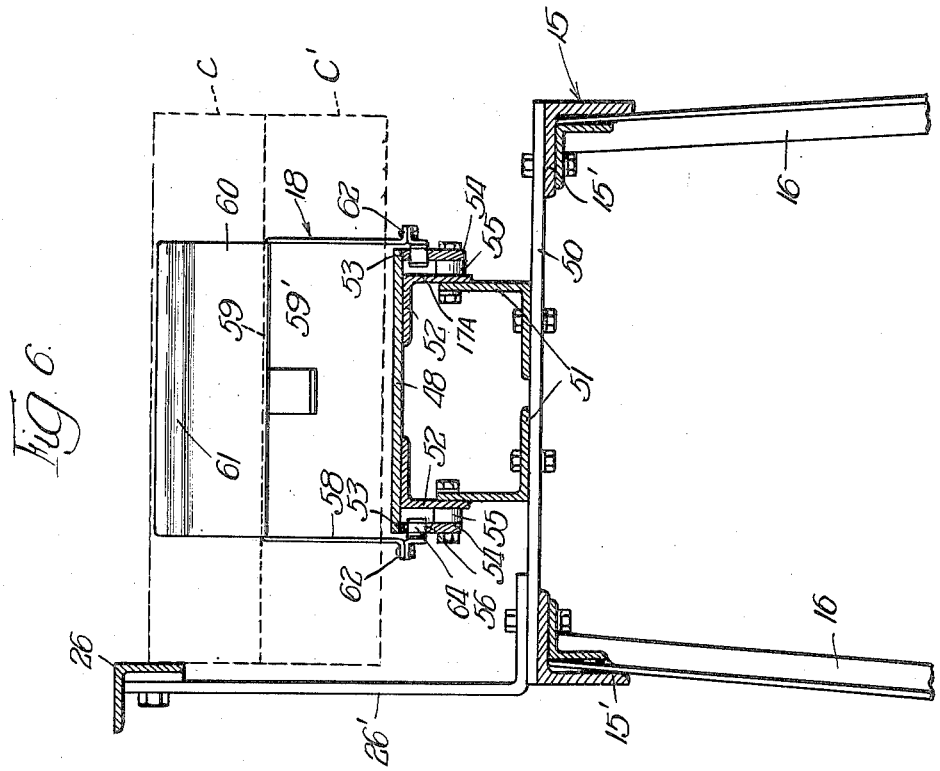
INVENTORS.
Richard J Fahey,
BY Martin Burger,
Cromwell, Greist + Warden
Attys.

Sept. 22, 1953 R. J. FAHEY ET AL 2,652,960
CARTON HANDLING AND LOADING APPARATUS
Filed Dec. 23, 1948 6 Sheets-Sheet 6
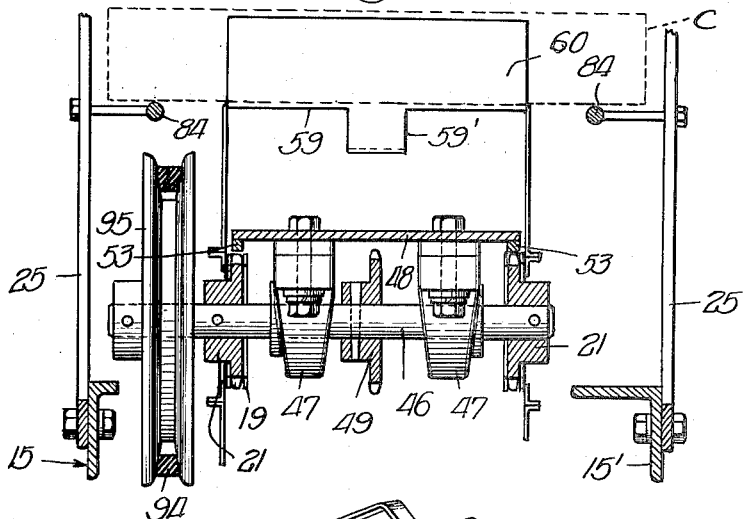
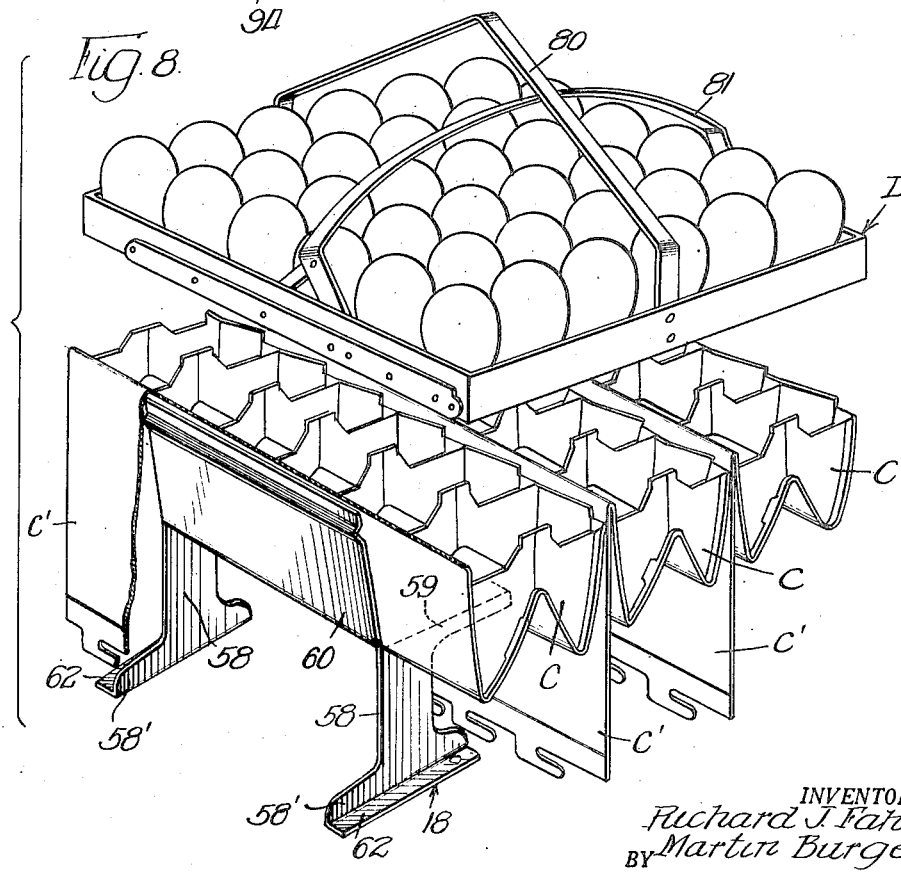
INVENTORS
Richard J. Fahey.
BY Martin Burger.
Cromwell, Greist & Warden
ATTYS Patented Sept. 22, 1953

2,652,960

UNITED STATES PATENT OFFICE 2,652,960

CARTON HANDLING AND LOADING APPARATUS

Richard J. Fahey, Evanston, and Martin Burger, Morris, Ill., assignors to General Package Corporation, a corporation of Delaware Application December 23, 1948, Serial No. 67,046

18 Claims. (Cl. 226—14)

The present invention relates to an improved apparatus for facilitating and expediting the handling and loading of cellular type, flexible paperboard cartons, such as egg cartons, as they are automatically progressed from a conventional carton set-up machine past a filling or loading station to a conventional carton closing mechanism, in which the integral hinged covers of the cartons are automatically closed and locked in place. More particularly, the invention concerns an apparatus for the foregoing purpose which operates continuously and uninterruptedly to group the erected, empty cartons issuing from the carton set-up machine in a close, side-by-side, i. e., front-to-rear sequence, extending longitudinally of the direction of their issuance from said machine, thereby enabling an operator positioned at one side of the path of carton advance to simultaneously insert the contents of a plurality of cartons therein in a single manual loading operation.

One of the most inefficient and time-consuming operations in a present day, large capacity, commercial egg candling and packing department, is that of transferring previously inspected and candled eggs from the conventional cellular fillers in which they are commonly arranged following candling into the conventional, 2 x 6 capacity cellular egg cartons in which they reach the ultimate home consumer. If performed manually, loading the twelve eggs to be packed in each carton one at a time, the operation is obviously an extremely tedious, slow procedure, calling for extensive and repeated handling of both the eggs and the packing materials involved. The resultant need for a numerous personnel multiplies not only the cost of operating, from a labor standpoint, but also the loss due to egg breakage. The low speed and efficiency of handling of the eggs in the carton loading phase greatly reduces the daily output of an egg room which in other respects may well be of the most modern and efficient character.

Paperboard egg cartons of the so-called 2 x 6 style, characterized by two parallel rows of six egg receiving cells and commonly provided with a hinged cover connected to one side wall thereof, are familiar to all. They are in wide use because, for one reason, their particular 3:1 dimensioning enables their packing and shipment, in lots of thirty dozen each, using the same standard, thirty dozen capacity packing cases or crates in which the eggs are commonly bulk-packed. In other words, the dimensions of these cartons are such that three thereof, placed in close front-to-rear relationship, occupy no more area than the standard 6 x 6 molded pulp or paperboard filler and flat assembly commonly employed in separating the bulk-packed, crated eggs. The operation of the apparatus of the present invention relies on this fact and, in essence, the invention resides in improved, efficient and continuously operative means for arranging and transporting the empty, erected cartons in the aforesaid closely adjacent, front-to-rear relation past a loading station. This enables an operator at said station, employing a well known type of multiple egg-lifter and handling device, to simultaneously remove thirty-six eggs from the case in which they are bulk-packed, and to deposit these eggs in the cells of the respective aligned cartons, twelve in each of three successive closely spaced cartons, as said cartons are transported continuously by the present apparatus, and automatically discharged, when loaded, to a cover closing apparatus.

It will thus be seen to be a general object of the present invention to provide a continuous, automatic apparatus, requiring a minimum of supervision or attention in operation, for receiving and transporting empty, erected egg cartons from a source of supply thereof in succession past a loading station, which apparatus is adapted to arrange said empty carton in close front-to-rear succession and to transport the same longitudinally in a sufficiently close spacing to enable an operator located at said loading station to fill a plurality of said cartons at a time, as a single operation.

Another object of the invention is to provide a carton handling, transporting and loading apparatus adapted to be associated in operative, receiving relation to a carton set-up machine, or other source of supply of set-up cartons, which apparatus includes a continuously moving, unidirectional, preferably endless chain type conveyor having carton supporting means adapted to receive and transport cartons successively deposited thereon from said source of carton supply in an immediate, front-to-rear relationship of said cartons to one another.

It is a still further object to provide an apparatus of the type referred to in which said continuously moving conveyor is disposed to travel in a path which parallels and is an extension of the path or line of discharge of set-up cartons from said set-up machine, or other source of carton supply.

Yet another object of the invention is to provide, in an apparatus for the foregoing purpose, an automatic carton set-up machine adapted to erect and discharge fully set-up egg cartons in a longitudinal series, the cartons being arranged in front-to-rear relation or succession, together with a continuously traveling, chain driven series of carton supports moving in line with the path of carton discharge and adapted to pass in receiving relation to said machine, and means for timing the travel of said supports with reference to the frequency of discharge of the set-up cartons from said machine whereby said cartons are automatically and accurately positioned, one on each of said supports, as the latter pass in said receiving relation to said set-up machine.

A more specific object of the invention is to provide an apparatus of the type referred to above including a plurality of serially traveling carton supports or "stools" on which empty, erected, hinged-cover type cartons are successively deposited from a source of supply; a device for automatically deflecting the normally upstanding covers of each of said cartons into a retracted, downwardly depending and non-interfering position therebehind, between the successive, serially traveling cartons; and an instrumentality adapted to receive cartons from said supports or "stools," following simultaneous multiple loading of the cartons, and to re-arranged and automatically deliver the same to a cover closing mechanism.

A still further specific object of the present invention, is to provide an apparatus involving a combination of a carton set-up machine, a carton transfer and loading device, a carton receiving and re-aligning device and a cover closing machine, in which said components are so constructed and arranged relative to one another, both in a positional sense and in the correlated timing thereof, that cartons are automatically and continuously erected by said set-up machine, have their covers retracted and are transported by said transfer device for multiple loading in an improved, expedited manner, are discharged to said re-aligning device, and are automatically operated on by said cover closing machine, without interruption of their continuous travel.

Another specific object is to provide a combination of a carton set-up machine and a carton transfer, cover retracting and loading device by which erected empty cartons are serially transported in close front-to-rear sequence past a loading station, in which said device is driven in accurate synchronism with and by said set-up machine, whereby to successfully receive set-up cartons in accurately spaced relationship from said machine, without personal supervision, to automatically and properly retract the carton covers to non-interfering position, and to transport the cartons in proper spacing past said loading station without further attention.

The above and other objects and advantages will be evident upon a consideration of the following description of a preferred embodiment of the invention and by reference to the accompanying drawings, in which, Fig. 1 is a fragmentary view in side elevation of an apparatus in accordance with the present invention, illustrating the assembly of the main component parts of said apparatus in their operative relation to one another;

Fig. 2 is a fragmentary top plan view of the apparatus illustrated in Fig. 1;

Fig. 3 is a somewhat enlarged fragmentary view in side elevation of the carton set-up and transporting components of the apparatus, certain housing provisions enclosing the drive gearing of the apparatus being broken away in order to more clearly illustrate the parts;

Fig. 5 is a fragmentary side elevational view constituting, in effect, a continuation of Fig. 3 and illustrating the carton discharge end of the carton transfer or transporting section of the apparatus, at which the filled cartons are discharged onto a re-aligning device driven in synchronism with said transporting mechanism;

Fig. 6 is a view in transverse, vertical cross section through the apparatus, approximately along line 6—6 of Figs. 3 and 5;

Fig. 7 is a view in transverse, vertical section along a line corresponding approximately to line 7—7 of Fig. 5; and Fig. 8 is a schematic view in perspective illustrating the operation of manually loading a plurality of set-up egg cartons and the relative position of the latter on the apparatus as they are continuously progressed past a loading station.

Figure 4:
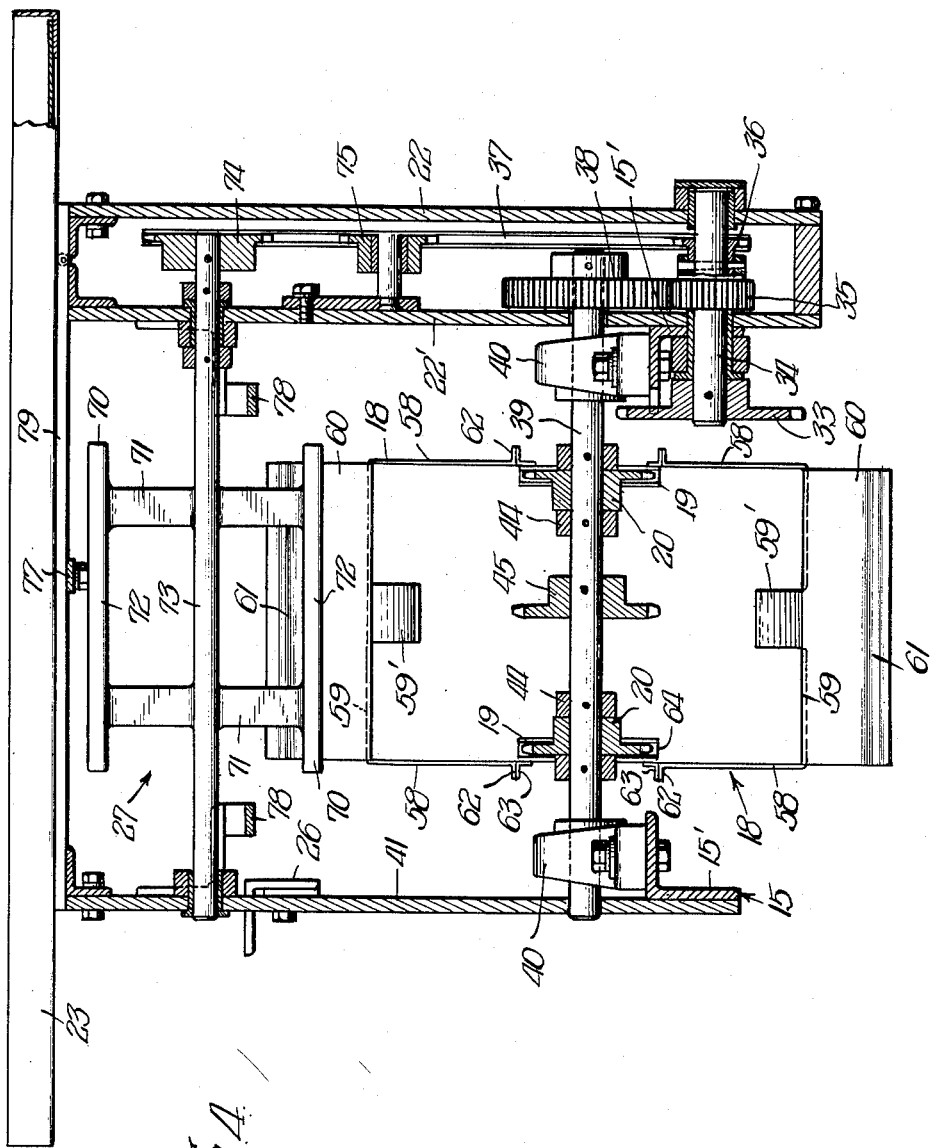
Fig. 4 is a view sectioned approximately along line 4—4 of Fig. 3, further illustrating the operative relationship of certain of the driving and carton cover deflecting components of the apparatus.

Referring particularly to Figs. 1 and 2 for a general description of the main component mechanisms of the carton handling and loading apparatus of the present invention, the reference numeral 10 generally designates a standard, conventional, automatic egg carton set-up machine, in which paperboard egg cartons are automatically erected from a relatively flat, knock-down condition, in which they are shipped or stored, to a fully set-up, egg receiving condition. Such a set-up device is illustrated and described in the patent to Burger 2,018,396 of October 22, 1935, although it is to be understood that any equivalent apparatus may also be employed, for example, that illustrated and described in the co-pending application of Le Roy F. Carkhuff, Serial No. 711,855, filed November 23, 1946, now Patent No. 2,572,800 of October 23, 1951. In set-up machines of this last named type the erected, empty cartons are discharged gravitationally along a vertically inclined slide 11 (see Fig. 3), the gravity discharge being supplemented by an oscillatory arm 12. This arm is actuated in timed relation to the operation of the set-up machine to engage the body of the set-up carton, which is designated C, and to forward the same downwardly and outwardly of the machine 10, the cover C' of the carton trailing. A forwardly projecting finger 13 serves to internally engage and guide the carton body during the discharge stroke.

Referring again to Figs. 1 and 2 the carton handling, transporting and loading mechanism of the apparatus is generally designated by the reference numeral 14. It includes a horizontal supporting frame 15 made up of a pair of angle iron side members 15' and provided with a set of legs 16 at its forward, discharge end. Said frame is sustained on the set-up machine 10 at its rear, infeed end by means of pins 17 carried by the frame side members 15', which pins are engageable in forked or slotted brackets 17' on the set-up machine frame. Obviously, other suitable provisions for mounting the transporting and loading mechanism 14 may be employed so long as it is held in fixed, longitudinally aligned, operating relation to the set-up machine, in predetermined, proper receiving relation to the set-up cartons issuing rapidly from said machine.

Frame 15 supports a fixed, elongated chain guide unit, generally designated 17A, specific details of which will be hereinafter described, along which certain shaped, sheet metal carton supports or "stools" 18 are serially transported in the direction of discharge of the carton from the set-up machine 10. These carton supports are activated by a pair of parallel conveyor chains or link belts 19 trained around sets of sprockets 20, 21 at the respective feed-in and discharge end of the mechanism 14, the upper reaches of said chains being supported and guided by the unit 17A. An upright gear housing defined by laterally spaced side plates 22, 22' is suitably supported by frame 15 adjacent said feed-in side of mechanism 14 and a suitable tray or platform 23 may be disposed across and supported in part by said housing, said tray serving to support a supply of knock-down cartons which are to be fed to the set-up machine 10 by the operator. A similar table or tray 24, may be provided at the discharge side of the conveyor, being mounted on angled uprights 25 secured to the frame 15 adjacent sprockets 21.

An elongated, angle iron carton end guide 26 serves to longitudinally align the cartons on the supports or "stools" 18 by slidably engaging an end of the serially traveling cartons. This action maintains the cartons in proper longitudinal alignment for the manual carton loading operation which is performed at a loading station designated S in Fig. 2 and during the travel of the cartons in immediate front-to-rear adjacency on their respective supports 18. Prior to filling of the cartons at the loading station S, the covers C' of the cartons are automatically retracted and depressed rearwardly to a depending position between successive cartons, this operation being performed as the cartons initially come under the control of mechanism 14 by means of a cover deflecting device which is generally designated 27.

Following travel on the conveyor supports past station S, the loaded cartons are sequentially discharged onto a rotary distributing table 28, by which they are re-aligned and forwarded in end-to-end relation into a cover closing mechanism M for subsequent automatic closing and sealing of the hinged carton cover. This mechanism may be of the type illustrated and described in the patent to Burger 1,994,241 of March 12, 1935.

Specific details of structure and relation of parts of the carton supply and feed-in side of the present apparatus are illustrated in Figs. 3 and 4, to which attention is now directed.

The mechanism 14 is driven in accurately timed relation to the operation of the carton set-up machine 10 by means of a link belt or chain 29 trained around an appropriately driven sprocket (not shown) of machine 10. It has not been deemed necessary to illustrate particular details of this driving arrangement; any positively and continually rotating shaft of the set-up machine 10 will serve as an appropriate source of power for the link belt or chain 29. Said belt passes around an adjustable idler or tension take-up sprocket 30 carried by an arm 31 which is pivotally adjustable at 32 on a frame side member 15'. Chain 29 drives a sprocket 33 (see Figs. 3 and 4) which is secured to a short stub shaft 34, said shaft being bushing-mounted in one side member 15' of frame 15 and in the side plates 22, 22' of the gear housing. Internally of said housing the shaft 34 has secured thereon a relatively small diameter pinion 35 and a relatively small chain drive sprocket 36 is pinned to the shaft to one side of said pinion, over which sprocket a vertically extending drive chain 37 is trained. The function of chain 37 will be hereinafter referred to in detail.

The pinion 35 is in meshing, driving relation to a gear 38 on the main, transversely extending chain conveyor drive shaft 39, said shaft extending into the housing and being suitably journaled in bearings 40 carried by the opposed frame side members 15'.

Referring to Fig. 4, a plate-like upright 41 is disposed in parallel, lateral alignment with the gear housing side plate 22'. This upright is supported by the frame side member 15' on the opposite side of the mechanism and coacts with said plate in rotatively supporting a portion of the cover retracting device 27, as will be hereinafter referred to in greater detail. Upright 41 sustains one end of the carton end guide 26; the other end thereof is supported by an upright 26' affixed to the machine frame.

The main conveyor drive shaft 39 has secured thereon the pair of identical chain driving sprockets 20, which are disposed in laterally spaced relation to one another on said shaft, held in such spacing by a pair of pinned collars 44. Conveyor chains 19 are trained around these driving sprockets. A further, supplemental driving sprocket 45 is also pinned on shaft 39 between the sprockets 43 and serves as a positive source of power for the shaft 46 on which the pair of conveyor sprockets 21 are mounted at the discharge end of the machine, as shown in Fig. 7. Said sprocket shaft 46 is carried by suitable bearings 47 which are in turn supported by and depend from an elongated horizontal track bed plate 48, a part of the chain guide unit 17A. This plate extends longitudinally of the mechanism 14 for the distance approximating that between the sprockets 20 at the feed-in side thereof and the opposite pair of sprockets 21. A central driven sprocket 49 is secured to shaft 46 between sprockets 21 and is driven directly from sprocket 45 on shaft 39 by a suitable connecting power transmitting chain, which it has not been deemed necessary or desirable to illustrate. This affords an independent drive for shaft 46, relieving conveyor chains 19 of this function.

The track bed plate 48 referred to above and the provisions for supporting the same on the frame 15 are illustrated in Figs. 3, 6 and 7. Referring particularly to Fig. 6, said frame is provided with a longitudinally spaced pair of full width bracer plates 50 bolted at opposite sides thereof to the frame side members 15', there being one such plate at each end of frame 15, located to one side of the respective shafts 39, 46. A single, elongated rectangular plate may be substituted for a pair of the plates spaced longitudinally of the frame, if desired. Angle brackets 51 bolted to plates 50 serve as supports for the pair of laterally spaced, elongated, track supporting angle irons 52 of the chain guide unit 17A, the track bed 48 of said unit and the shaft bearings 47 being appropriately bolted, welded or otherwise secured to the horizontal flanges of said angle irons 52, as shown in Fig. 6.

Elongated chain guide or track members 53 are secured to opposite sides of bed 48 to depend therefrom and, in vertically spaced relation directly below said track members 53, the coacting elongated track or chain guide members 54 are secured to the angle irons 52, the spacers 55 serving to appropriately locate said members 54 directly beneath the respective coacting members 53. Thus the members 53 and 54 serve to define an elongated open guide track or channel 56 therebetween, said channel extending longitudinally of the space between the sprockets 20, 21 at the respective opposite ends of the endless conveyor chains 19. The respective upper reaches of the said chains travel in said channels and are supported and stabilized in their travel, being guided positively on top and bottom sides thereof, so as to steady the carton supports or "stools" 18 in their continuous translation longitudinally of the apparatus.

Referring to Fig. 3, 6 and 8, wherein structural details of the aforesaid supports or "stools" 18 are illustrated, the latter are preferably fabricated as sheet metal stampings, being died out and bent to produce the upright side legs 58, which are spaced from one another a distance somewhat greater than the lateral spacing of the chains 19 and are provided with rearwardly projecting heel extensions 58', a connecting horizontal seat 59 which projects somewhat forwardly of the legs 58, and a rearwardly inclined back rest 60 coextensive in width with the seat. This back rest has a rearwardly extending ridge 61 embossed thereacross to control the carton cover C' when the latter is retracted by the device 27 to an inoperative, depending position. The horizontal seat 59 is also provided with a central rearwardly and downwardly inclined lip 59' for the same general purpose of cover control, as will be described.

The stool legs 58 and rear heel extensions 58' thereof are outwardly flanged at 62 and said flanges are appropriately secured adjacent their forward ends to outturned lugs 63 affixed to one of the links 64 of the respective chains 19. Adjacent the rear of the heel portions 58' the "stools" 18 adapted to rest on further outturned lugs 65 carried by a pair of rearwardly spaced chain links (see Figs. 3 and 5), whereby the carton supports 18 are stably sustained, with their seats 59 in horizontal position, as the aforesaid supports are transported through the upper reach of chains 19, guided on either vertical side by the coacting chain guide members 53, 54. At the beginning and end of the return, reverse travel along the lower reach of the conveyor chains, the supports 18 may fall away somewhat from the chains at the heel portions thereof in rounding sprockets 20 and 21, as illustrated in Fig. 3.

As pointed out above, the timing of the carton transfer and loading mechanism 14 is such that a carton support 18 is presented in receiving relation to the carton set-up machine 10 coincident with the forward stroke of its carton ejecting arm 12, whereby a set-up carton C propelled by said arm is received without delay on and carried away by the support 18, in the fashion illustrated in the dotted lines in Fig. 3. This carton is elevated around the chain sprocket arc, without interruption of the movement of the support 18, to a horizontal position for forward translation by the conveyor chains 19. While being so elevated, the cover C' of the carton, which normally extends upwardly therefrom, is folded rearwardly by device 27 and disposed downwardly relative to its body, between the back rest 60 of the support 18 therefor and the succeeding carton support, out of the way of the operator in the manual work of subsequently loading the carton contents. The cover folding device 27 is best illustrated in Figs. 3 and 4, to which reference is directed.

Said device includes a two-armed, rotary cover folding member 70 characterized by pairs of radial arms 71 provided with transversely extending, rod-like wiping elements 72 at the extremities thereof. These arms are affixed to and extend diametrically of the transverse rotary folder shaft 73 which is supported by bushings in the side plate or wall 22' of the gear housing and in the shaft supporting frame upright 41. Shaft 73 extends into the gear housing, having a sprocket 74 pinned thereto internally of said housing. The vertically extending drive chain 37 referred to above is trained around sprocket 74, likewise around an adjustable slack take-up sprocket 75 mounted internally of the housing, whereby said shaft 73 and folder member 70 are rotatively driven in timed relation to the travel of the chain conveyor 19, the arrangement being such that the aforesaid folder rotates in counterclockwise direction as viewed in Fig. 3.

Shaped stationary folder bars 77, 78 coact with the member 70 in the downward positioning of the carton cover. The bar 77 is positioned centrally of the apparatus, extending rearwardly and downwardly thereof and a pair of the bars 78 of either side of the folding member 70 likewise extend rearwardly in a gradual downward inclination. The central bar 77 is brought sharply upwardly, to provide clearance for the rotating folder element 70, and is secured to a rigid cross piece 79 of the machine frame 15. The bars 78 are supported in any appropriate manner to said frame, adjacent either side thereof. In operation, as the carton is being elevated around the left-hand chain sprocket 20, the cover C' thereof engages the rearwardly projecting wiper bars 77, 78 and is deflected thereby in a counterclockwise direction to a position somewhat beneath the horizontal, as illustrated in Fig. 3. In this position, it is next engaged by the reversely rotating transverse wiper 72 of the folder member 70, to be positively deflected further downwardly toward a vertical position and immediately to the rear of the back rest 60 of the support or "stool" 18 on which the carton is resting. Ridge 61 of the back rest tends to limit the extent of the downward swing. Wiper element 72 then travels forwardly in synchronism with the advancing support 18 to maintain this position of the cover C' for a sufficient length of time to allow the succeeding carton support 18 to be brought upwardly into a position to engage said cover, thereby to prevent undesired return upwardly under its normal inherent resilience. The central depending lips 59' on the respective supports 18 are provided to maintain control of the carton covers as regards their inherent resilience and tendency to spring upwardly.

With the carton covers C' properly positioned between the succeeding carton supports 18, and with the cartons C on those supports positioned very closely adjacent one another, due to the close front-to-rear relation of the supports on chains 18, the cartons are transported continuously lengthwise of the mechanism 14 by the conveyor, during which time three successive cartons are simultaneously filled by each attendant at station S, in a single manual operation. For this purpose the attendant employs a manual, multiple egg lifter device of the type shown in the patent to Johnson 2,011,972 of August 20, 1935, to remove the eggs from a case and bulk egg filler. A device of this character, generally designated D, is suspended by its handle 80, as illustrated in Fig. 8, over three of the prepared, properly positioned empty cartons C. This view illustrates the vertical alignment of the thirty-six eggs in device D with relation to the individual egg receiving cells of the three cartons. The operator then manipulates the operating lever 81 of the lifter D, causing certain bottom forming flaps of said device (not shown) to shift from horizontal to vertical position. Thus released, the eggs drop into the cells of the three subjacent cartons C, which cells, as pointed out above, duplicate in their position the positions of the eggs as commonly packed in a conventional 6 x 6 cardboard egg filler.

A few operators positioned along the side or sides of the carton conveyor can easily maintain all cartons supplied by a rapidly operating set-up machine 10 filled as they travel along the conveyor. This eliminates a severe time bottleneck and a heavy labor cost in the handling and packaging of eggs in a comercial egg handling establishment.

Reaching the end of the conveyor, the filled cartons C are discharged from their supports 18 onto the rotary distributor 28, after which said supports successively retract downwardly about sprockets 21 for their return travel on the lower reach of the chain conveyor. In thus retracting the upstanding rear back rest 60 of the "stool" 18 serves to push its carton forwardly along the parallel rod-like slide bars 84, which are appropriately supported on the frame uprights, 25, onto the rotary table 28.

Referring to Fig. 5, the apparatus frame 15 is provided with a pair of forwardly projecting side extensions 85 which provide a bearing at 86 for the vertical shaft 87 of the rotary distributor table 28. Said frame extensions 85 also serve to support an upright 88 on which a curved restraining fence or guard 89 is supported in encircling relation to the margin of table 28, between the transfer and loading mechanism 14 and the closer mechanism M. Shaft 87 is spring-loaded downwardly by the coil spring 90 surrounding the same and located between a cross piece 91 of the frame extension 85, through which the shaft extends, and a bottom stop ring 92 on the shaft.

The table 28 is rotated at constant speed by means of an elongated, flexible, endless V-belt 94 disposed around suitable large and small diameter pulleys 95, 96. The large diameter pulley is secured to the sprocket shaft 46 (see Figs. 5 and 7) and the smaller is rotatably mounted by a pin 97 on an upwardly angled arm 98 pivoted on the frame extension 85 to one side of the axis of table 28. Said arm 98 is spring-urged upwardly by a coil spring 99 disposed between the same and frame extension 85 to bring the upper surface of V-belt 94, as it passes around the pulley 96, into frictional driving engagement with the lower surface of the table 28, thereby rotating the latter in counterclockwise direction as viewed in Fig. 2. Such rotation of the table carrys the cartons C discharged thereon forwardly and circumferentially in wiping engagement with the curved fence 89. This serves to realign the filled carton for endwise travel in end-to-end relation, with the carton cover C' extending to the right over fence 89, as viewed in Fig. 2.

A deflector or guide 100 extends outwardly from the feed-in side of the cover closing and sealing machine M to engage a carton re-aligned and advanced by rotary table 28 and to direct the carton longitudinally onto the driven conveyor belt 101 of the closing machine. It is conveyed by said belt through the machine M, being sequentially operated on automatically by the various instrumentalities of the latter, including the curved cover closing plow 102, to progressively fold the cover C' over the contents of the carton and insert its locking tabs into interengaged relation with the body of the carton. Machines of this type being well known, it is not necessary to further describe the construction or operation thereof.

The above apparatus is very rugged, simple and inexpensive in component parts, but fills a long felt need of commerical egg rooms for apparatus to expedite the repacking of eggs in individual, dozen capacity cartons, as an incident to the candling operation. The apparatus is an improvement on that shown and described in our copending application Serial No. 711,992, filed November 23, 1946, in that it represents a considerable simplification of the structure of the last named apparatus, and an increasedly rapid operation, primarily due to the continuous, uninterrupted character of the movement of its parts. Operation of the apparatus is also considerably simplified, due to the arrangement of the operating parts in a single line along which the loading station is located. A single operator can perform plural duties including the loading of knockdown cartons to set-up machine 10, the reception and disposal of bulk packing materials, the manual loading of the cartons and the visual inspection of the eggs for cracks, dirt, etc., as they traverse the apparatus.

We claim:

1. Carton handling and loading apparatus comprising means for supplying erected, empty, hinged-cover type cartons, a frame, a horizontally extending, endless conveyor traveling on said frame in receiving relation to said carton supply means, means for continuously advancing said conveyor, said conveyor having a plurality of carton supports arranged thereon to travel therewith in immediate front-to-rear adjacency with reference to the direction of travel of the conveyor and receiving erected cartons from said supply means for transport on a horizontal reach of the conveyor, means movable relative to said frame to downwardly deflect the covers of said cartons, while they are being conveyor-transported, toward a retracted position between successive cartons on said respective supports, and means in direct receiving relation to said conveyor to receive therefrom cartons loaded during travel thereon.

2. Carton handling and loading apparatus comprising means for supplying erected, empty, hinged-cover type cartons, a frame, a horizontally extending, endless conveyor traveling on said frame in receiving relation to said carton supply means, means for continuously advancing said conveyor, said conveyor having a plurality of carton supports arranged thereon to travel therewith in immediate front-to-rear adjacency with reference to the direction of travel of the conveyor and receiving erected cartons from said supply means for transport on a horizontal reach of the conveyor, means movable relative to said frame to downwardly deflect the covers of said cartons, while they are being conveyor-transported, including a rotary deflector and means to drive said rotary deflector in timed relation to the movement of said conveyor to fold the carton covers rearwardly of the path of carton travel toward a retracted position between successive cartons on said respective supports, and means in direct receiving relation to said conveyor to receive therefrom cartons loaded during travel thereon.

3. Carton handling and loading apparatus comprising means for linearly forwarding empty, erected, hinged cover type egg cartons in a direction transverse the cover hinge thereof, a frame, an endless belt type conveyor traveling on said frame in immediate receiving relation to said carton forwarding means, means for continuously advancing said conveyor in timed relation to the operation of said carton forwarding means and in alignment with the direction of travel of cartons forwarded by the latter, said conveyor having a plurality of carton supports thereon receiving cartons from said forwarding means, with the covers of the cartons projecting outwardly of said conveyor and supports thereon, and means movable relative to said frame to automatically deflect the covers of said cartons downwardly as the latter are transported on said supports to a retracted position between successive cartons on said supports, said supports being arranged on said conveyor to travel therewith in longitudinal alignment and immediate front-to-rear adjacency to one another.

4. Carton handling and loading apparatus comprising means for linearly forwarding empty, erected, hinged cover type egg cartons in a direction transverse the cover hinge thereof, a frame, an endless belt type conveyor traveling on said frame in immediate receiving relation to said carton forwarding means, means for continuously advancing said conveyor in timed relation to the operation of said carton forwarding means and in alignment with the direction of travel of cartons forwarded by the latter, said conveyor having a plurality of carton supports thereon receiving cartons from said forwarding means, with the covers of the cartons projecting outwardly of said conveyor and supports thereon, means movable relative to said frame to automatically deflect the covers of said cartons downwardly as the latter are transported on said supports, and means to move said last named means in timed relation to the movement of said conveyor to positively engage and rearwardly fold the carton covers to a retracted position between successive cartons on said supports, said supports being arranged on said conveyor to travel therewith in longitudinal alignment and immediate front-to-rear adjacency to one another.

5. Carton handling and loading apparatus comprising means for linearly forwarding empty, erected, hinged cover type egg cartons in a direction transverse the cover hinge thereof, a frame, an endless belt type conveyor traveling on said frame in immediate receiving relation to said carton forwarding means, means for continuously advancing said conveyor in timed relation to the operation of said carton forwarding means and in alignment with the direction of travel of cartons forwarded by the latter, said conveyor having a plurality of carton supports thereon receiving cartons from said forwarding means, with the covers of the cartons projecting outwardly of said conveyor and supports thereon, means movable relative to said frame to automatically deflect the covers of said cartons downwardly as the latter are transported on said supports to a retracted position between successive cartons on said supports, said supports being arranged on said conveyor to travel therewith in longitudinal alignment and immediate front-to-rear adjacency to one another, and means aligned with and in receiving relation to said conveyor to receive cartons therefrom loaded during travel thereon, said last named means comprising a rotary device and means coacting therewith to change the direction of travel of the cartons from one transverse the carton cover hinge to one paralleling said hinge.

6. Handling and loading apparatus for cellular hinged cover type cartons comprising a frame, a horizontal, endless belt type conveyor traveling on said frame, means for continuously advancing the conveyor longitudinally, a plurality of carton supports mounted on said conveyor in close front-to-rear adjacency in the direction of travel of said conveyor, each of said supports comprising a traveling carton seat disposed horizontally when said conveyor is traversing a horizontal reach and an upwardly extending back rest in fixed relation to said seat and behind cartons resting on the latter, and means to successively retract the covers of said cartons rearwardly over said respective back rests to a retracted position between successive cartons on said supports.

7. Handling and loading apparatus for cellular, hinged cover type cartons comprising a horizontal, endless belt type conveyor trained about horizontally spaced sprocket members and means for continuously advancing the same longitudinally, a plurality of carton supports mounted on said conveyor to travel therewith in close front-to-rear adjacency in the direction of travel of said conveyor, each of said supports comprising a traveling carton seat disposed horizontally when said conveyor is traversing a horizontal reach and an upwardly extending back rest in fixed relation to said seat and behind cartons resting on the latter, and means positioned adjacent one of said sprocket members and acting to successively retract the covers of said cartons rearwardly over said respective back rests, as said supports round said sprocket member, to a retracted position between successive cartons on said supports.

8. Handling and loading apparatus for cellular hinged-cover type cartons comprising a horizontal, endless belt type conveyor and means for continuously advancing the same longitudinally, a plurality of carton supports mounted on said conveyor to travel therewith in close front-to-rear adjacency in the direction of travel of said conveyor, each of said supports comprising a carton seat disposed horizontally when said conveyor is traversing a horizontal reach and an upwardly extending back rest, and driven means to successively retract the covers of said cartons rearwardly over said respective back rests, said last named means being driven in timed relation to the movement of said conveyor to fold the carton covers toward a retracted position between successive cartons on said supports.

9. Handling and loading apparatus for cellular, hinged-cover type cartons comprising a horizontal, endless belt type conveyor trained about horizontally spaced sprocket members and means for continuously advancing the same longitudinally, a plurality of carton supports mounted on said conveyor in close front-to-rear adjacency in the direction of travel of said conveyor, each of said supports comprising a carton seat disposed horizontally when said conveyor is traversing a horizontal reach and an upwardly extending back rest, and driven means positioned adjacent one of said sprocket members and acting to successively retract the covers of said cartons rearwardly over said respective back rests as said supports round one of said sprocket members, said last named means being driven in timed relation to the movement of said conveyor to fold the carton covers toward a retracted position between successive cartons on said supports.

10. In combination with means for supplying empty, hinged cover type cartons in a linear path, a carton handling and loading device comprising an endless, orbitally traveling conveyor having a horizontal reach of substantial length extending transversely of the carton cover hinges, a plurality of traveling carton supporting seats mounted on said conveyor in closely adjacent relation longitudinally thereof, said conveyor being positioned relative to said supply means to traverse said carton supply path and to receive cartons on said supporting seats in so traversing said path, said seats being disposed horizontally in traversing said horizontal reach and being of sufficient area to afford stable support for the bottoms of cartons resting thereon, and means acting on cartons transported longitudinally on said seats to deflect the outwardly extending covers thereof rearwardly of the path of conveyor movement and downwardly to retracted position between successive supported cartons.

11. In combination with means for supplying empty, hinged cover type cartons in a linear path, a carton handling and loading device comprising an endless, orbitally traveling conveyor having a horizontal reach of substantial length extending transversely of the carton cover hinges, a plurality of traveling carton supporting seats mounted on said conveyor in closely adjacent relation longitudinally thereof, said conveyor being positioned relative to said supply means to traverse said carton supply path and to receive cartons on said supporting seats in so traversing said path, said seats being disposed horizontally in traversing said horizontal reach and being of sufficient area to afford stable support for the bottoms of cartons resting thereon, and means acting on cartons transported longitudinally on said seats to deflect the outwardly extending covers thereof rearwardly of the path of conveyor movement and downwardly to retracted position between successive supported cartons, said seats each having an outwardly projecting rear member in fixed relation thereto about which said covers are folded by said last named means.

12. In combination with means for supplying empty hinged cover type cartons in a linear path, a carton handling and loading device comprising an orbitally traveling conveyor trained about spaced sprocket members to provide a horizontal reach of substantial length, a plurality of traveling carton supporting seats mounted on said conveyor in close adjacency to one another longitudinally thereof, said horizontal conveyor reach being longitudinally aligned with the path of supply of said cartons and the conveyor being positioned relative to said supply means to upwardly intercept said carton supply path and receive cartons on said supporting seats prior to entering said horizontal reach, said seats being disposed horizontally in traversing said horizontal reach and being of sufficient area to afford stable support for the bottoms of cartons resting thereon, means acting on said cartons during travel on said seats to deflect the covers thereof rearwardly and downwardly to retracted position between successive seats, and means at the end of said horizontal reach to receive cartons from said conveyor.

13. In a handling and loading apparatus for hinged cover type egg cartons, an endless conveyor including a generally horizontally extending reach, means to drive said conveyor, a plurality of carton supporting seats mounted in close longitudinal adjacency on said conveyor to extend above said reach in traversing the same, means positively guiding said seats during travel on said upper reach, said supporting seats including a generally horizontal carton supporting member and an upwardly extending rear member, and a movable rotary cover deflector driven in timed relation to said conveyor and successively engageable with the covers of said cartons to fold the same about said rear member toward retracted position between successive carton supporting seats.

14. In a handling and loading apparatus for hinged cover type egg cartons, an endless conveyor including a generally horizontal reach, means to drive said conveyor, a plurality of carton supporting seats mounted in close longitudinal adjacency on said conveyor to extend above said reach in traversing the same, means positively guiding said seats during travel on said upper reach, said supporting seats including a generally horizontal carton supporting member and an upwardly extending rear member, fixed means engaging upstanding covers of the traveling cartons to direct the same rearwardly of the path of travel, and a movable cover deflector driven in timed relation to said conveyor and successively engageable with said covers to further fold the same about said rear member to fully retracted position between successive carton supporting seats.

15. Carton handling and loading apparatus comprising an endless flexible conveyor trained around longitudinally spaced end pulleys to provide vertically spaced, oppositely traveling, elongated horizontal reaches, a plurality of traveling carton supporting seats mounted in closely adjacent longitudinal relation to one another on said conveyor, carton supply means in longitudinal alignment with said conveyor at one end thereof to successively deliver hinged cover type cartons to said seats for support and advance thereon along one of the conveyor reaches, said seats being disposed horizontally in traversing the uppermost of said reaches and being of sufficient area to afford stable support for the bottom of a carton resting thereon, means to drive said conveyor, means to deflect the covers of said advance cartons toward retracted position between successive carton supporting seats, and means in receiving relation to the other end of said conveyor to receive and re-align said cartons.

16. Carton handling and loading apparatus comprising an endless flexible conveyor trained around longitudinally spaced end pulleys to provide vertically spaced, oppositely traveling, elongated horizontal reaches, a plurality of traveling carton supporting seats mounted in closely adjacent longitudinal relation to one another on said conveyor, carton supply means in longitudinal alignment with said conveyor at one end thereof to successively deliver hinged cover type cartons to said seats for support and advance thereon along one of the conveyor reaches, said seats being disposed horizontally in traversing the uppermost of said reaches and being of sufficient area to afford stable support for the bottom of a carton resting thereon, means to drive said conveyor, means to deflect the covers of said advancing cartons toward retracted position between successive carton supporting seats, means in receiving relation to the other end of said conveyor to receive said cartons, and a cover closing mechanism in receiving relation to said last named means to fold said covers to carton engaging position.

17. Carton handling and loading apparatus for hinged cover type cartons comprising an endless conveyor trained around opposed forward and rear pulley members at opposite ends thereof, a plurality of carton supports connected to said conveyor in closely adjacent, front-to-rear relation, each of said supports comprising a generally horizontal seat and an attaching portion depending from said seat and attached to said conveyor, said supports being translated forwardly by said conveyor on one of the horizontal reaches of the latter in close, uniform serial order and being spread substantially from one another in rounding the rear pulley member, means positioned adjacent said rear pulley member to supply erected cartons bottom side first onto said support seats as said supports round said last named pulley member in spread relation, and means acting on said cartons to deflect a cover of each thereof rearwardly and downwardly as said carton supports round said rear pulley member and approach said horizontal reach.

18. Carton handling and loading apparatus for hinged cover type cartons comprising an endless conveyor trained around opposed forward and rear pulley members at opposite ends thereof, a plurality of carton supports connected to said conveyor in closely adjacent front-to-rear relation, each of said supports comprising a generally horizontal seat, an upwardly extending rear portion and an attaching portion depending from said seat and attached to said conveyor, said supports being translated forwardly by said conveyor on one of the reaches of the latter in close, uniform serial order and being spread substantially from one another in rounding the rear pulley member, means positioned adjacent said rear pulley member to supply erected cartons bottom side first onto said support seats as said supports round said last named pulley member in spread relation, and means for rearwardly and downwardly deflecting said covers about said respective seat rear portions in said spread relation of said carton supports.

RICHARD J. FAHEY.
MARTIN BURGER.

References Cited in the file of this patent

UNITED STATES PATENTS

| Number | Name | Date |
|---|---|---|
| 2,045,767 | Funk | June 30, 1936 |
| 2,261,767 | Johnson | Nov. 4, 1941 |
| 2,430,878 | Kimball | Nov. 18, 1947 |